Aug. 7, 1928.
H. E. SEAGRAVES
1,679,631
RECORDING APPARATUS FOR OARSMEN
Filed Sept. 30, 1925
2 Sheets-Sheet 1
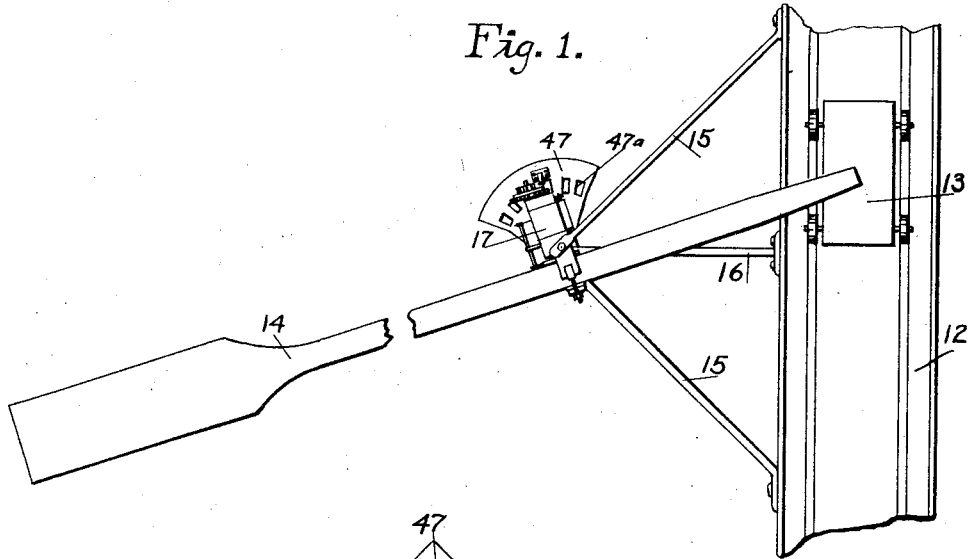
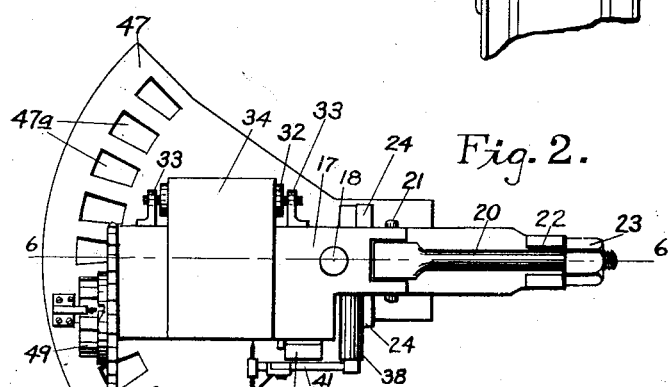
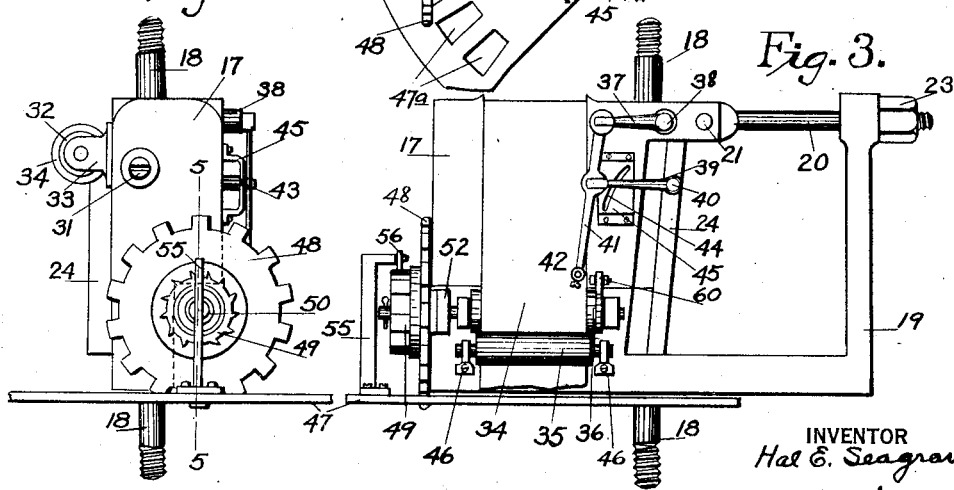
INVENTOR
Hal E. Seagraves
BY Albert H. Adams
ATTORNEY Aug. 7, 1928.   1,679,631
H. E. SEAGRAVES
RECORDING APPARATUS FOR OARSMEN
Filed Sept. 30, 1925   2 Sheets-Sheet 2
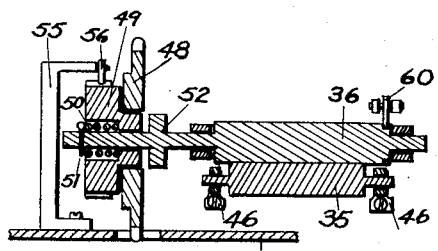
Fig. 5.
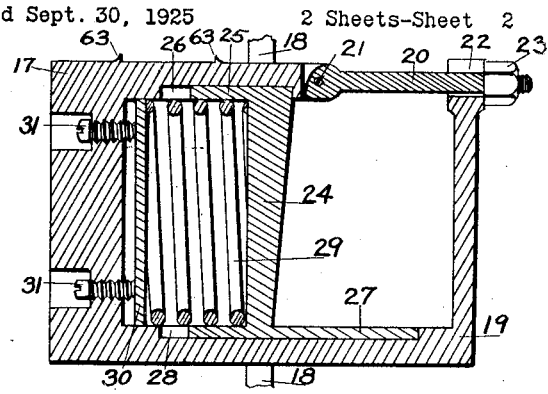
Fig. 6.
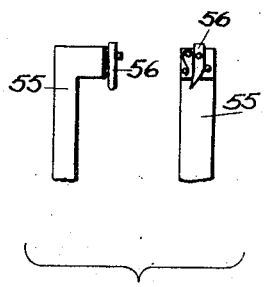
Fig. 7.
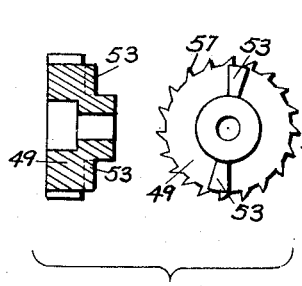
Fig. 8.
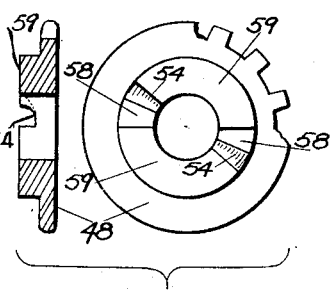
Fig. 9.
Fig. 10.
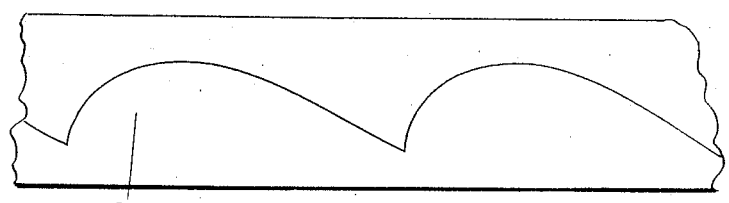
Fig. 11.
INVENTOR
Hal E. Seagraves
BY Albert H. Adams
ATTORNEY Patented Aug. 7, 1928.

1,679,631

UNITED STATES PATENT OFFICE.

HAL E. SEAGRAVES, OF TACOMA, WASHINGTON.

RECORDING APPARATUS FOR OARSMEN.

Application filed September 30, 1925. Serial No. 59,602.

In connection with the training of a rowing crew it is desirable that a record be made of the rowing strokes of each member of the crew, which record shall be of a character that can be preserved and examined at leisure by the coach who is in charge of the training of the crew. By having such a record made that will adequately and correctly indicate the power applied by an oarsman throughout a propelling stroke of his oar, the coach can more readily determine weaknesses and other rowing faults in individual members of the crew than by depending solely upon his observation of the crew in actual rowing. A record so made will, therefore, be of great aid to a coach in determining the relative rowing values of the members of the crew and enable him to more definitely instruct each individual member thereof.

It is the leading object of this invention to provide such a recording apparatus for use in such relation to each oar of a racing shell that the power applied to an oar throughout the propelling stroke thereof will have an individual and permanent record made of it; and in order that the paper upon which the record is made shall not be of too great length so as to be unduly bulky when in roll form, it is another object of the invention to provide a construction that will be effective for recording any predetermined number of the strokes, as for example, every third, fourth, fifth, etc. stroke. Still a further object is to provide means, such as a pantograph device for enlarging the records of the power strokes to make such records more readily understandable. I accomplish these objects by the construction and arrangement of parts shown in the drawings and hereinafter described. That which is believed to be new will be set forth in the claims.

In the drawings:—

Fig. 1 is a plan view of a portion of a racing shell and one of the right-hand oars thereof, in connection with which is shown apparatus embodying my invention;

Fig. 2 is an enlarged plan view of the recording apparatus shown in Fig. 1;

Fig. 3 is a side elevation thereof;

Fig. 4 is an end elevation of the same;

Fig. 5 is a vertical central section through certain parts of the apparatus, the section being taken substantially on line 5—5 of Fig. 4;

Fig. 6 is an enlarged vertical central section taken substantially on the line 6—6 of Fig. 2, the arc-shaped rack plate shown in Fig. 2 being omitted;

Fig. 7 shows details that are, respectively, edge and face views of the pawl that engages the clutch member, a portion of the standard that the pawl is pivotally connected with being also shown;

Fig. 8 shows details that are, respectively, a central section and a face view of the clutch member that the pawl of Fig. 7 engages with;

Fig. 9 shows details that are, respectively, a central section and a face view of the gear which is mounted upon a hub of the clutch member shown in Fig. 8;

Fig. 10 shows in front and side elevation, respectively, one of the brackets for the roller to which the record paper strip passes; and Fig. 11 shows a portion of the record strip with typical power stroke records made thereon.

Referring to the several figures of the drawings and in which corresponding parts are referred to by the same reference characters,—12 indicates a portion of a racing shell, one of the usual sliding seats thereof being shown and indicated by 13. An outrigger for the proper support of each oar is to be provided as usual. The single outrigger device here shown for the oar 14 that is pulled by the occupant of the seat 13 comprises two bars 15 that are inclined from the shell toward each other, and also a brace bar 16. The outer ends of the bars 15 are separated from each other a sufficient distance to receive between them a casing 17, which, as clearly shown in Figs. 3, 4 and 6, is provided on its upper and lower faces, respectively, with studs 18 that are in alinement with each other. These studs 18 project through holes in the outer end portions of the outrigger bars 15 and serve as journals upon which the casing and the parts carried thereby can be turned. As shown, the studs have screw-threaded end portions to adapt nuts to be screwed thereon so as to hold the casing and outrigger bars together, such nuts, however, not being screwed down tightly enough to prevent the desired swinging movement of the casing. One end portion of the casing is in the form of an angular arm 19, the upturned branch of the arm serving to hold the bar in place. As a further means of holding the oar against displacement there is provided a latch 20 pivoted at 21 to an extension of the upper wall of the casing 17 and lying in a notch 22 formed in the upper end of the side branch or member of the angular arm 19,—the latch being secured in place by a nut 23 that is screwed upon it, as clearly shown.

Within the casing 17 and having a limited movement longitudinally thereof is a comparatively heavy head 24 that has formed with it, in the construction shown, an upper guide block 25 fitting in a recessed slideway 26 and a lower guide block 27 fitting in a recessed slideway 28 that is formed partly in the wall of the casing proper and partly in the inner face of the lower branch of the angular arm 19, as best shown in Fig. 6. As clearly seen by an inspection of said Fig. 6, the ends of the slideways form stops to limit the extent of movement of the head. The oar that is employed will rest upon that portion of the lower guide block that moves upon the angular arm 19. During the power or operative stroke of the oar, the force of the pull exerted by the oarsman will be transmitted, of course, to the head 24 and tend to move it toward the closed end of the casing 17. This inward movement of the head is opposed by a heavy coiled spring 29 that bears at one end against the inner face of the head, and, in the construction shown, bears at its other end against a plate 30 that is adjustable to different distances from the end of the casing by set-screws 31. The tension of the spring 29 can thus be adjusted as desired, and, as will be understood, during the power or propelling stroke of the oar the fulcrum of the oar, to-wit, the point on the face of the head against which the oar bears, will be substantially in line with the journals or pivot studs 18 on which the casing 17 turns. As shown clearly in Fig. 6, the outer or oar-contacting face of the head is inclined downwardly, the better to resist any upward sliding tendency of the oar, and, as best shown in Figs. 2 and 4, the head projects considerably beyond each side of the casing, so as to afford a wide and secure surface for the oar to bear against.

The desired record of the strokes of an oarsman is made on a sheet of paper drawn from a web or roll of paper mounted on a suitable roller and thereafter led between two other rollers, said last-named two rollers, in the construction shown, being journalled upon the opposite wall of the casing from that with which the feed roller is connected. The paper is moved intermittently to accord with those strokes only for which a record is to be taken. Before entering upon a description of the means by which the paper is intermittently moved from the feed roller to the other rollers, I will refer to the location and arrangement of the rollers themselves, and the means by which the recording is effected. The feed or supply roller, upon which a web of paper is mounted, is indicated by 32, and is located, as here shown, opposite the rear face of the casing 17,—meaning thereby the face nearer to the racing shell,—and near the upper end of such casing, such roller being journalled in suitable brackets 33. The paper from the web on this roll is indicated by 34. It passes from the under part of the web up over the rounded upper surface of the casing 17 and down against the opposite or front face of the casing, between the bite of a pair of drawing rollers 35 and 36, and is deposited within a cover or housing that will be provided for enclosing all of the recording mechanism, but which I have not deemed necessary to show in the drawings. As is shown in Fig. 5 the roller 35 is journalled in brackets 46 that by their resiliency will tend to hold such roller in close engagement with the roller 36. As indicated by dotted lines in Fig. 4 the lower part of the casing 17 is recessed and the rollers 35 and 36 are set in such recess. Ribs 63 on the surface of the casing 17 act as guides for the moving sheet of paper.

Connected with the reciprocating or sliding head 24 is a means, such as a pencil or stylus, for making a mark upon the paper 34. Inasmuch as the movement of the head is a comparatively short one it is evident that the mark made upon the paper should be of greater length laterally of the paper strip than such head movement, and I have therefore interposed between the head and the actual marking member (hereinafter referred to as a pencil) an enlarging device such as the pantograph, that is most clearly shown in Fig. 3. The upper one of the parallel arms of this pantograph is indicated by 37 and it is pivoted at 38 on a stud extending out from a fixed projecting portion of the casing 17, while the lower one of such arms, 39, is pivoted at 40 to a stud in one edge of the reciprocating head 24. The long connecting arm 41, to which the said parallel arms 37 and 39 are pivoted, carries at its free end the marking pencil that is indicated by 42. A pin 43 on the arm 41 engages in a curved slot 44 in a wide bracket 45 for guiding purposes, as will be understood.

In order to make a record or "graph" that will satisfactorily illustrate the power of a stroke of the oar and show to what extent the power applied by the oarsman was maintained—whether evenly or otherwise—throughout the whole of the stroke, it is necessary, of course, that the paper be moved along and over the casing, but such paper is not to be constantly moved, inasmuch as it is not necessary, of course, to move it during the return or inoperative stroke of the oar. Referring now to such paper moving mechanism,—47 indicates an arc-shaped flat plate bolted or otherwise secured to the lower one of the diagonal outrigger bars and lying below and projecting beyond the casing 17. Through this plate are a series of openings 47ª as clearly shown in Fig. 2 arranged concentrically with the axis upon which the casing 17 turns. These openings are adapted to be engaged by the teeth of a wheel 48 to cause a turning of such wheel and hence constitute a rack. A curved rack-bar obviously might be substituted for this row of openings.

The wheel 48 has a large central opening through it to adapt it to be rotatably mounted upon an enlarged hub projecting from one face of a clutch member 49 that is loosely mounted upon the same shaft that the roller 36 is secured upon, as best shown in Fig. 5. The clutch member 49 is provided with a central annular recess in which is located a short coiled spring 50 that bears at one end against the inner end of the recess and at its other end against a cotter pin 51 inserted through a hole made in the said shaft. The tendency of the spring, therefore, is to cause the clutch member 49 to move inward on the shaft of the roller 36. Secured upon this shaft is a collar 52 which constitutes a second clutch member that at certain times and under certain conditions, as hereinafter set forth, is adapted to be engaged by the other clutch member 49 so as to compel a turning of the shaft and the roller 36 that is fast thereon. The engaging faces of the two clutch members may be serrated or otherwise formed to insure proper engagement with each other, as will be understood.

The clutch member 49 is provided on that face that lies against the toothed wheel 48 with two alined radial ribs 53 that are adapted to be projected into correspondingly shaped grooves 58 in the adjacent face of the toothed wheel and by bearing against the straight wall portion of such grooves (see the sectional view in Fig. 9) compel a rotation of such wheel. The opposite side of each of the grooves is inclined or beveled as at 54 so that when the clutch member is turned in the opposite direction,—that is when a return stroke of the oar is being made—the ribs 53 will ride up such inclines out of the grooves 58 and bear against the flat face portions 59 of the toothed wheel. At 55 is shown a standard rising from and securely affixed to the stationary rack-plate 47, said standard having a turned upper portion to which is pivotally attached a pawl 56 that is adapted in certain positions of the clutch member 49 to operatively engage with one of the ratchet teeth 57 formed on the said clutch member. At 60 is shown another pawl adapted to engage with ratchet teeth carried at one end of the roller 36,—see Fig. 3.

In operation, and assuming that the ribs or lugs 53 of the clutch member 49 are seated in the grooves 58 of the toothed wheel 48 and that in consequence the opposing surfaces of the hub of the member 49 and the collar member 52 are in clutching engagement, a power stroke of the oar will result in swinging the casing on its pivot studs 18, and as such movement takes place the wheel 48 will be caused to turn by reason of its teeth engaging the holes 47ª in the rack of the stationary plate 47. Inasmuch as during this power-stroke movement the clutch member is locked to the toothed wheel because of its ribs bearing against the flat sides of the grooves 58 such clutch member will turn with the wheel, and as the projection of the ribs into those grooves brings the clutch member into close engagement with the member 52 that is fast on the shaft of the roller 36 such roller will also be turned, and, as will be understood, the paper 34 will be drawn down between it and the companion roller 36. During such movement of the paper the pencil 42 will make a record thereon which will indicate the amount of power applied by the oarsman, the point in his stroke where the greatest amount of power was applied, the evenness of the stroke, etc., as will be understood from the description given of the manner of connecting the pencil with the spring-pressed sliding head 24 and the fact that such head constitutes the fulcrum for the oar.

Now upon the completion of the power stroke and the release of the pressure of the oar against the head 24 the pencil will have been brought back into position for the commencement of the making of another record, but such other record will not be made until the predetermined number of unrecorded power strokes of the oar have been made, such non-recording of certain power strokes being due to the holding out of interlocking engagement of the clutch member 49 with the wheel 48 and the consequent holding of such clutch member out of operative engagement with the member 52 on the shaft of the roller 36. This result is accomplished as follows:—Immediately upon the start of a return stroke after the making of a recording power stroke the wheel 48 will of course be reversely rotated owing to the engagement of its teeth with the fixed rack. During this reverse movement of the wheel the pawl 60 will hold the roller 36 against any movement, but, owing to the location of the ribs 53 in their respective grooves 58, the clutch member will partake of that reverse movement. As this reverse motion of the toothed wheel 48 commences the clutch member 49 will have its contact broken with the collar or member 52 that is fast on the shaft of the roller 36 because of the fact that the radial ribs 53 start up the inclined surfaces 54.

The toothed wheel 48 and the clutch member 49 turn as a unit owing to their frictional contact until one of the teeth 57 of the clutch member comes in contact with the pivoted pawl 56. The pawl will stop the rotation of the clutch member with the toothed wheel but owing to the continuation of the rotation of such wheel the ribs 53 moving, relatively, along the inclines 54 will cause the clutch member 49 to move back against the pressure of the coiled spring and to come in contact with the flat surfaces 59. The contact of the pivoted pawl 56 with a tooth 57 is of short duration because of the fact that the whole operating mechanism is turning in the arc of a circle except the rack 47 and the standard 55 to which latter the pawl is pivoted. On every power or operative stroke the pawl 56 comes in contact with the clutch member 49 but because of the construction and pivoting of such pawl it will trip over the teeth of such clutch member, as will be readily appreciated by reference to Fig. 7. On every return or inoperative stroke the pawl catches a tooth 57 and by such engagement therewith momentarily holds the member 49 against movement so that its ribs 53 are changed in position relatively a short distance along on the surfaces 59 of the toothed wheel. The clutch member 49 is held in frictional contact and turns with the wheel except when interrupted, as stated, by coming in contact with the pawl 56 on the return stroke. Thus it will be seen that, owing to the frictional contact of the ribs 53 with the flat surfaces 59 of the toothed wheel, and which is due to the pressure exerted by spring 50, the clutch member 49 will travel with the said wheel during all of each non-recorded stroke and also for some portion of each return stroke. In the early part of each of the return strokes it is retarded, as just described, by the pawl being turned so as to engage operatively with a ratchet tooth 57. The period of retardation can be made to depend, as will readily be understood, upon the character of the ratchet teeth that the pawl has to operatively engage, and the length of time that the clutch is so retarded determines the number of non-recording power strokes that are made between each of the two strokes of which records are made. That this is the case is apparent when it is borne in mind that the radial ribs 53 are relatively moved a short distance over the surfaces 59 of the wheel at each of said retardations and remain in their new positions on those surfaces until the next retarding occurs. Then after the predetermined number of such temporary stoppages of the clutch has occurred the wheel 48 will have been brought to such position that the ribs on the clutch face will come opposite the grooves 58 just at the beginning of a power stroke of the oar and be forced thereinto by the pressure of the coiled spring 50, with the result of causing a rotation of the roller 36 and the making of a record of that stroke, as before described.

The character of the records made by the pencil on the moving sheet of paper is represented in Fig. 11, and such records will graphically indicate the power applied by an oarsman throughout an operative or power stroke. By analyzing the records made by an apparatus embodying my invention, the following advantages, among others, are secured:

1st. The height of the curve will indicate the power applied by an oarsman.

2nd. The part of the stroke at which the maximum power was applied can be readily determined.

3rd. The general smoothness or finish of the stroke is easily discernible.

4th. The endurance of an oarsman can be determined by comparing the height of a curve taken at the beginning of a trial race with the height of a curve taken at the finish of the race.

5th. By measuring the areas within the curves made by all the men on one side of the boat, and comparing those measurements with those of the curves made by all the men on the opposite side of the boat, it can readily be determined if a proper balance and arrangement of the men has been made, for the greater the total area the greater the power applied.

6th. An accurate determination of the efficiency of a boat can be found by running trial races, over a course having uniform water conditions, and then measuring the areas of all the curves, the sum of which areas will give the total power applied that was responsible for driving the boat a given distance in a certain length of time.

7th. A crew member's rowing faults can be shown to him by the records that he has made in a trial race, and comparisons made from time to time to determine whether such faults are being overcome.

8th. The records made by successful oarsmen may be kept on file and serve as an indication to others of the desired type of stroke.

Any appropriate covering means for protecting the apparatus, or any portion of it, from dampness may be employed, but I have not deemed it necessary to illustrate such covering.

What I claim as new is:

1. The combination with an oar-propelled boat of a spring-pressed reciprocating head and a pivoted support therefor connected with one side of the boat, said head adapted to serve as a fulcrum for an oar, means connected with said head for making a record of the power exerted by an oarsman on such oar, and other means for regulating the number of strokes of which a power record is made.

2. The combination with an oar-propelled boat of a pivotally mounted sliding member connected to one side of the boat, which member is adapted to be both rotated and moved away from the boat by the pressure of an oar against it, a spring tending to force said sliding member toward the boat, a marking pencil, means connecting said pencil with said sliding member, a sheet of paper opposite and in contact with the point of said pencil, holding means for said sheet rotatable about the same axis as that about which said sliding member turns, and other means for causing a movement of said sheet to compel the making of a record thereon of the power exerted by an oars-man on an oar, such last-named means comprising an element independently connected with the boat.

3. The combination with an oar-propelled boat of a pivotally-mounted reciprocatable member connected with one side of the boat, which member is adapted to be both rotated and moved away from the boat by the pressure of an oar against it, a spring tending to force said sliding member toward the boat, a marking pencil, means for holding said pencil connected with and at a distance from said member, said connecting means being adapted to continuously vary the distance between said member and pencil while such member is being reciprocated and rotated, a sheet of paper opposite and in contact with the point of the pencil, holding means for said sheet rotatable about the same axis as that about which said reciprocatable member turns, and other means for causing a movement of said sheet to compel the making of a record thereon of the power exerted by an oarsman on an oar, such last-named means comprising an element independently connected with the boat.

4. The combination with an oar-propelled boat of a pivotally-mounted supporting member connected with one side of the boat, a sliding head on said member rotatable with the supporting member and also adapted to be moved away from the boat by the pressure of an oar against it, a spring tending to force said head toward the boat, a marking pencil, means connecting said pencil with said head, a sheet of paper opposite and in contact with the point of the pencil, means for movably holding said sheet on said pivotally-mounted supporting member, and other means for moving said sheet of paper only on certain predetermined power strokes of the oar less than the whole number of such strokes, said last-named means comprising a rotatable element mounted on said supporting member and also a device independently connected with the boat and in engagement with said rotatable element.

5. The combination with an oar-propelled boat of a pivoted member connected with one side of the boat, a spring-pressed head slidingly supported by said member and rotatable with the latter when said member is turned on its pivot, said head serving as a fulcrum for an oar, and means connected with said head for making a record of the power exerted by an oarsman on such oar.

6. The combination with an oar-propelled boat of a laterally-movable pivoted casing connected with one side of the boat, a spring-pressed head slidingly mounted in said casing and movable laterally therewith as such casing is turned on its pivot, a marking device operated by the sliding movement of such head, means for holding such marking device connected with and at a distance from the head, a movable record sheet opposite said marking device, and means operated by the turning of said casing on its pivot for moving said sheet past said marking device.

7. The combination with an oar-propelled boat of a laterally-movable pivoted casing connected with one side of the boat, a spring-pressed head slidingly mounted in said casing and movable laterally therewith as such casing is turned on its pivot, a marking device operated by the sliding movement of the head, means for holding such marking device connected with and at a distance from the head, a record sheet opposite said marking device, and means for intermittently moving the record sheet past and in contact with said marking means.

8. The combination with an oar-propelled boat of a spring-pressed reciprocatable and pivotally-supported fulcrum for an oar, said fulcrum being connected with one side of the boat, a marking device operated by the reciprocating movement of said fulcrum, means for holding such marking device connected with and at a distance from said fulcrum, means for holding a sheet of paper, means for moving said sheet of paper past and in contact with said marking means, and other means for preventing movement of said paper-moving means until a predetermined number of power strokes of the oar have been made.

9. The combination with an oar-propelled boat of a pivoted casing connected with one side of the boat, spring-pressed means within the casing adapted to be moved by pressure of an oar during a power stroke of the oar, a marking device, means for holding said marking device connected with and at a distance from said spring-pressed means, a sheet of paper opposite said marking device, a roller carried by the casing and over which roller said sheet passes, a rotatable device through a central opening in which the shaft of said roller projects, means for engaging and rotating said rotatable device when said casing is turned on its pivots, two clutch members on the shaft of said roller, one of said clutch members and the said rotatable device having their opposed surfaces provided with means for holding such clutch member out of engagement with the other clutch member until said rotatable device has rotated backward and forward a predetermined number of times, and a spring tending to force such clutch member toward said rotatable device.

10. The combination with an oar-propelled boat of a pivoted support connected with one side of the boat, spring-pressed means carried by said support adapted to be moved by pressure of an oar during a power stroke of such oar, a marking device, means for holding said marking device connected with and at a distance from said spring-pressed means, a sheet of paper opposite said marking device, a roller carried by said pivoted support and over which roller said sheet passes, a rotatable toothed wheel through a central opening in which the shaft of said roller projects, a stationary curved rack with which said wheel engages, two clutch members on the shaft of said roller, said wheel and one of said clutch members having means on their opposed surfaces for positively engaging them one with the other when the wheel is turned in one direction, spring means for holding said two last-named parts in frictional but non-positive engagement for a predetermined number of power strokes of the oar, and means for causing a relative slipping motion between said two parts on the return strokes of the oar to gradually bring such parts into position to effect said positive engagement.

11. The combination with an oar-propelled boat of a frame pivotally mounted adjacent a side of said boat, a block slidably mounted on said frame adapted to serve as a fulcrum for an oar and to be moved thereby, means for yieldably resisting movement of said block, and means for recording the movement of said block.

12. The combination with an oar-propelled boat of a frame pivotally mounted adjacent a side of said boat, a block slidably mounted on said frame adapted to serve as a fulcrum for an oar and to be moved thereby, means for yieldably resisting movement of said block, a recording device, and means for transmitting the movement of said block to said recording device.

HAL E. SEAGRAVES.